No. 771,060. Patented September 27, 1904.

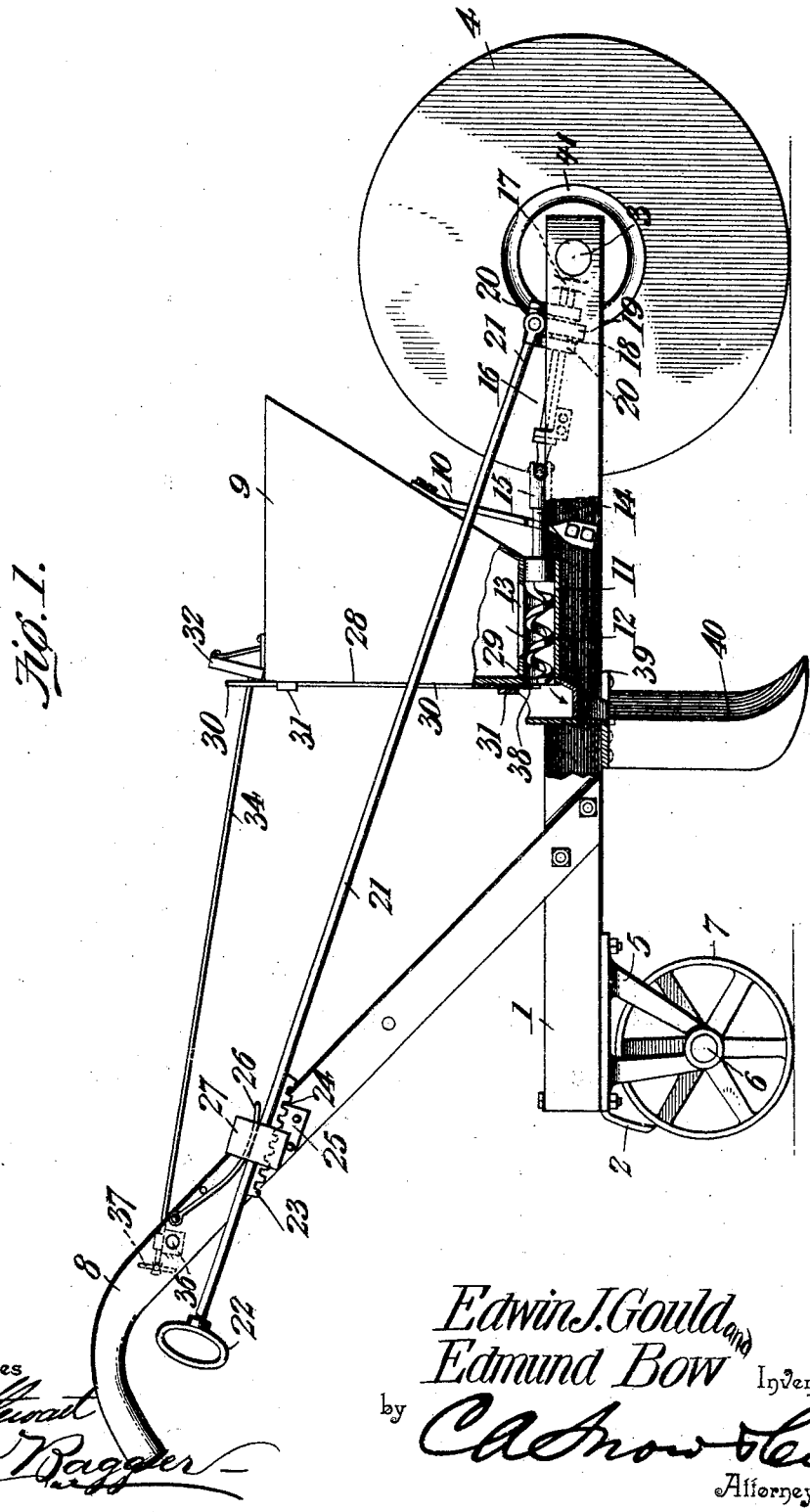

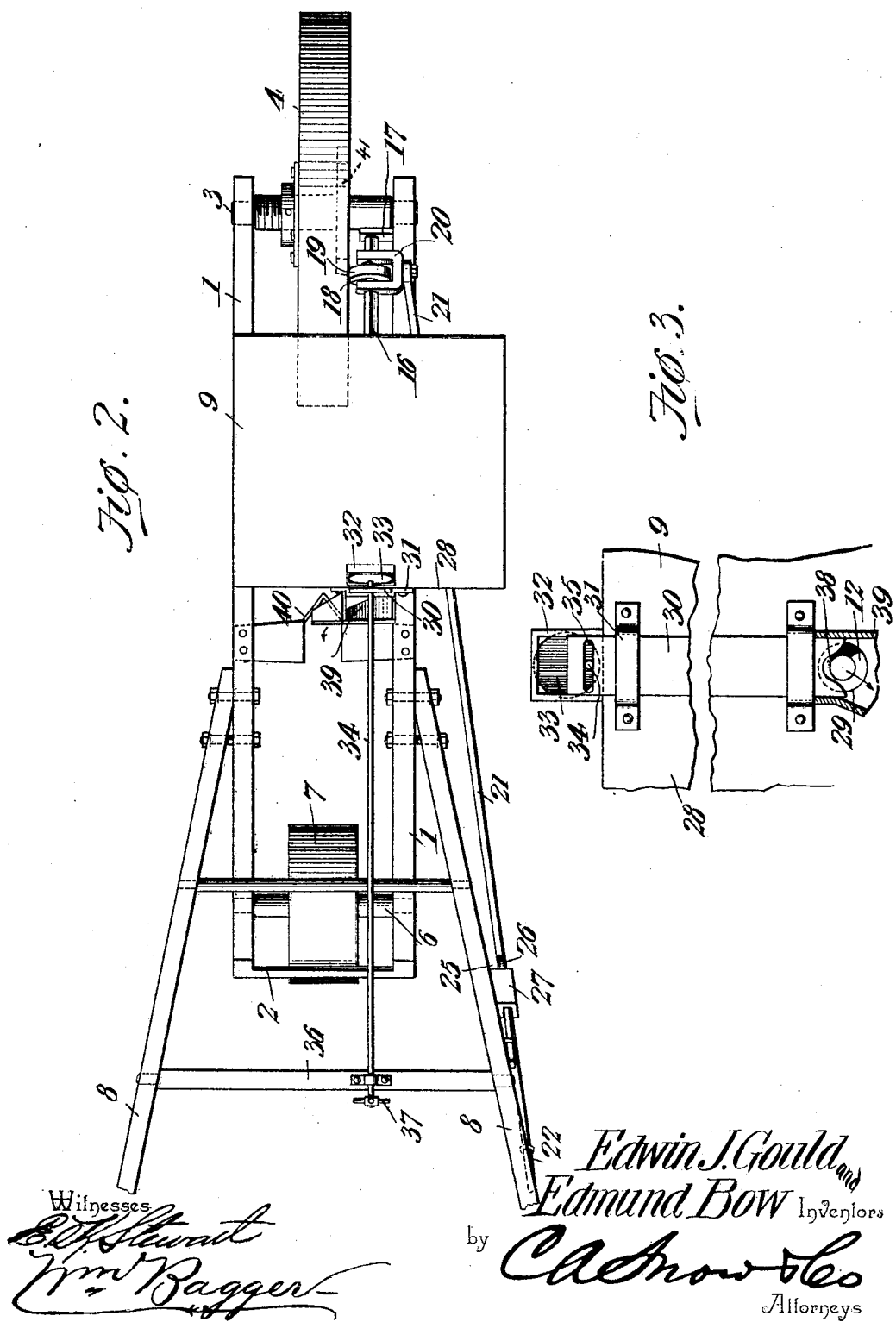

UNITED STATES PATENT OFFICE.

EDWIN J. GOULD AND EDMUND BOW, OF BOULDER, COLORADO.

SEED-PLANTER.

SPECIFICATION forming part of Letters Patent No. 771,060, dated September 27, 1904.

Application filed February 23, 1904. Serial No. 194,823. (No model.)

*To all whom it may concern:*

Be it known that we, EDWIN J. GOULD and EDMUND BOW, citizens of the United States, residing at Boulder, in the county of Boulder and State of Colorado, have invented a new and useful Seed-Planter, of which the following is a specification.

This invention relates to seed-planters, and especially to that class of planters which are used for depositing seeds of all kinds in drills or continuous rows.

The invention has for its object to provide a device of this class which shall be especially adapted for gardening purposes, which shall be simple in construction, easily operated, and effective in operation and in which provision shall be made for varying the quantity of seed deposited when the machine is in operation, the seed passing from the hopper to the seed-spout in full view of the operator, who is thus enabled to regulate the flow to suit the existing conditions.

With these and other ends in view the invention consists in the improved construction, arrangement, and combination of parts, which will be hereinafter fully described, and particularly pointed out in the claims.

In the accompanying drawings has been illustrated a simple and preferred form of the invention, with the understanding that changes and modifications may be made within the scope of the invention and without departing from the spirit or sacrificing the utility of the same, especially with regard to size, proportion, and exact manner of assemblage.

In the drawings, Figure 1 is a side elevation, partly in section, of a seed-planter constructed in accordance with the principles of our invention. Fig. 2 is a top plan view of the same. Fig. 3 is a sectional elevation in detail, on a somewhat enlarged scale, of the rear side of the hopper and related parts.

Corresponding parts in the several figures are indicated by similar numerals of reference.

The frame of the machine is exhibited as composed of side pieces 1 1, connected at their rear ends by a cross-piece 2 and at their front ends by an axle 3, carrying a transporting-wheel 4. The rear ends of the side pieces support brackets 5, affording bearings for an axle 6, carrying a covering-wheel 7. The frame is equipped with handles 8, and it supports a hopper 9, having an inclined front wall, which is preferably braced to the side pieces, as shown at 10. In the bottom of the hopper is disposed a casing 11, which is cylindrical in shape and which contains a force-feed screw 12. The latter consists of a coreless spiral, and it receives the seed through a slot or opening 13 in the upper side of the casing. The front end of the feed-screw is connected with a shaft 14, the front end of which is connected, by means of a coupling 15, with a non-circular shaft 16, the front end of which has a bearing in a lug 17, extending laterally from one of said side pieces of the frame at the front end of the latter. Mounted slidingly upon the non-circular shaft 16 is a hub 18, carrying a friction-pulley 19, which is in frictional engagement with one side of the supporting-wheel 4, which constitues a friction-disk. It is to be understood that the friction-disk does not necessarily also constitute the supporting-wheel. Under some circumstances it may be found desirable to provide a separate supporting or transporting wheel and to transmit motion in any suitable well-known manner from such wheel to a friction-disk which is in engagement with the friction-pulley 19, substantially in the manner described.

It is obvious that the speed of rotation of the shaft 16 may be regulated by moving the friction-pulley 19 either toward or from the axis of the friction-disk 4. For the purpose of providing for such adjustment a yoke 20 is employed, the arms of which have perforations for engaging the shaft 16 on opposite sides of the hub of the friction-pulley 19. This yoke 20 is pivotally connected with an operating-rod 21, which extends rearwardly and terminates in a handle 22 within reach of the driver. This operating-rod is provided with a plurality of teeth 23 on its under side adapted to engage corresponding teeth 24 in a plate 25, which is secured to one of the handles and with which the said operating-rod is held in engagement by the action of a suitably-arranged spring 26, which, as well as the operating-rod, extends through the keeper 27. It is obvious that by placing the rear end of the rod against the tension-spring, out of engagement with the teeth 25, the rod 21 may be manipulated so as to move the friction-pulley 19 either toward or from the axis of the friction-disk 4, thereby diminishing or increasing the speed of rotation of the said friction-pulley, of the shaft 16, and of the feed-screw.

The rear wall 28 of the hopper is provided near its lower end with an opening 29, which is in alinement with the rear end of the screw-casing 11 and which is capable of being partially or entirely closed by means of a slide 30, fitted to move vertically in keepers 31 upon the rear side of the wall 28. Upon the upper side of the hopper is mounted a boxing 32, containing a disk 33, which is connected eccentrically with a rod 34, that extends through a horizontal slot 35 in the upper end of the slide 30. Thus by rotating the rod 34 the eccentric disk 33 will be rotated in its boxing, and the rod engaging the slot 35 will raise or lower the slide 30, according to the direction of rotation. The rear end of the operating-rod 34 has a bearing in a cross-piece 36 to connect the handles of the device, and it is provided with an end piece 37, by means of which it may be rotated to effect the desired adjustment of the slide. The latter is provided at its lower end with a rounded recess 38, engaging the open rear end of the screw-casing, so as to form a gradual cut-off for the latter. In rear of the screw-casing and in full view of the operator is disposed a nozzle or chute 39 for conveying the seed to the drill-tube 40.

The operation and advantages of this invention will be readily understood from the foregoing description, taken in connection with the drawings hereto annexed. When the machine is in operation, the contents of the hopper will pass through the slot 13 into the screw-casing and into engagement with the force-feed screw 12, whereby it is conveyed in a rearward direction and discharged at the rear end of the casing into the nozzle 39, the speed of rotation of the screw, and hence the rapidity of the feed, being gaged by means of the friction-pulley 19, adjustably engaging the disk 4, as hereinbefore described. The feed, moreover, is capable of being regulated by means of the slide or cut-off 30, which is in the nature of an auxiliary regulating mechanism which permits the operator to check and to regulate the feed while the planting is being proceeded with. This is important, because the device is intended for the planting of all kinds of seeds, large and small, light and heavy, and it is well known that the deposit of some kinds of seed cannot be regulated successfully by means of a feed-screw alone. The cut-off therefore becomes a valuable auxiliary to the feed-regulating mechanism. The means for adjusting the slide or cut-off is extremely simple and requires no special fastening means of any kind. Said slide-adjusting mechanism, as well as the means for regulating the speed of the feed-screw, may be operated at any time, even while the machine is in operation.

For the propulsion of the machine draft of any kind or character may be employed. A small garden-drill may be operated by hand-power alone. In larger machines provision may be made for the attachment of draft.

Under the preferred construction of the invention the friction-disk is provided with an annular groove in its engaging side or face, as shown in the drawings at 41. It is obvious that by pushing the pulley 19 until it is in alinement with said groove frictional contact will cease and the feed-screw will cease to be rotated. In this manner the machine will be thrown out of operation while it is being transported from one place to another.

Having thus described our invention, we claim—

1. In a seed-planter, the combination with a hopper and seed-dropping mechanism including a rotary feed-screw, of means for operating said feed-screw including a friction-disk having an earth-engaging periphery and an annular groove, a friction-pulley engaging the friction side of said disk, means for transmitting motion from said friction-pulley to the feed-screw, and means for adjusting the friction-pulley radially with relation to the friction-disk and the annular groove in the latter.

2. In a seed-planter, a hopper, a cylindrical casing at the bottom of said hopper, open at its rear end and having a slot in its upper side, a coreless, spiral feed-screw in said casing, a shaft extending forwardly from the casing and carrying said feed-screw, a non-circular shaft mounted upon the frame of the machine, a universal connection between said non-circular shaft and the screw-carrying shaft, a friction-wheel having a ground-engaging periphery, a friction-pulley engaging said friction-disk and mounted upon the non-circular shaft, and means for effecting rotary adjustment of said friction-pulley with relation to the friction-disk.

3. In a seed-planter, a force-feed screw, a shaft carrying said screw, a non-circular shaft connected with the screw-carrying shaft, a hub slidably engaging the non-circular shaft and carrying a friction-pulley, a friction-disk having one side in engagement with said pulley, a yoke having perforated arms engaging the non-circular shaft on opposite sides of the slidable hub, an operating-rod connected pivotally with said yoke, and means for adjusting said operating-rod and for securing it at the desired adjustment.

4. In a seed-planter, a force-feed screw, a shaft carrying the same, a non-circular shaft connected with the screw-carrying shaft, a friction-disk having an annular groove in its engaging side, a friction-pulley adjustable upon the non-circular shaft and engaging with the friction-disk, and means for adjusting and for retaining at the desired adjustment the said friction-pulley.

5. In a seed-planter, a hopper, a cylindrical casing at the bottom of said hopper, open at its rear end and having a slot in its upper side, a force-feed screw in said casing, means for rotating said screw, a vertically-movable slide having a notched lower end forming a closure for the rear end of the feed-casing and provided with a horizontal slot near its upper end, a boxing supported upon the hopper, a disk confined within said boxing, and a rotatably-mounted rod connected eccentrically with said disk and extending through the slot in the cut-off slide.

In testimony that we claim the foregoing as our own we have hereto affixed our signatures in the presence of two witnesses.

EDWIN J. GOULD.
EDMUND BOW.

Witnesses:
J. F. Fox,
W. M. Halligan.